(12) United States Patent
Ferrari et al.

(10) Patent No.: US 9,168,797 B2
(45) Date of Patent: Oct. 27, 2015

(54) TYRE DEMOUNTING MACHINE

(76) Inventors: Gino Ferrari, Correggio (IT); Franco Maioli, Correggio (IT)

( * ) Notice: Subject to any disclaimer, the term of this patent is extended or adjusted under 35 U.S.C. 154(b) by 297 days.

(21) Appl. No.: 13/880,008

(22) PCT Filed: Oct. 21, 2011

(86) PCT No.: PCT/IB2011/054715
§ 371 (c)(1),
(2), (4) Date: Apr. 17, 2013

(87) PCT Pub. No.: WO2012/052970
PCT Pub. Date: Apr. 26, 2012

(65) Prior Publication Data
US 2013/0206341 A1   Aug. 15, 2013

(30) Foreign Application Priority Data

Oct. 22, 2010   (IT) .............................. MO2010A0295

(51) Int. Cl.
*B60C 25/05* (2006.01)
*B60C 25/138* (2006.01)

(52) U.S. Cl.
CPC ........... *B60C 25/0506* (2013.04); *B60C 25/138* (2013.01)

(58) Field of Classification Search
CPC ........ B60C 25/00; B60C 25/02; B60C 25/05; B60C 25/0506; B60C 25/0527; B60C 25/0539; B60C 25/0545; B60C 25/0563; B60C 25/0578; B60C 25/0593; B60C 25/125; B60C 25/128; B60C 25/135; B60C 25/138; B60C 25/14
USPC .......................... 157/1.17, 1.2, 1.26, 1.28, 1.3
See application file for complete search history.

(56) References Cited

U.S. PATENT DOCUMENTS

| 3,844,328 | A  * | 10/1974 | Lund ............................ 157/1.24 |
| 4,524,813 | A  * | 6/1985  | Gering ......................... 157/1.17 |
| 7,108,036 | B2 * | 9/2006  | Spaggiari .................... 157/1.24 |
| 2004/0221964 | A1 | 11/2004 | Bonacini |
| 2008/0060766 | A1 | 3/2008 | Bonacini |
| 2008/0173408 | A1 * | 7/2008 | Vignoli ......................... 157/1.24 |
| 2012/0222823 | A1 * | 9/2012 | Mimura ........................ 157/1.17 |

* cited by examiner

*Primary Examiner* — Hadi Shakeri
(74) *Attorney, Agent, or Firm* — Themis Law

(57) ABSTRACT

A tire demounting machine includes a base; a support unit for supporting wheels on a rest plane, and rotatable about a first axis of rotation, which is supported on the base and is equipped with lock and release devices for the wheels supported thereon; a work-tool supporting column which extends from the base (2) and has a longitudinal axis substantially parallel to the first axis of rotation, a first support element for supporting at least three work-tools on the rest plane being mounted slidably along the longitudinal axis and towards or from the support unit.

14 Claims, 6 Drawing Sheets

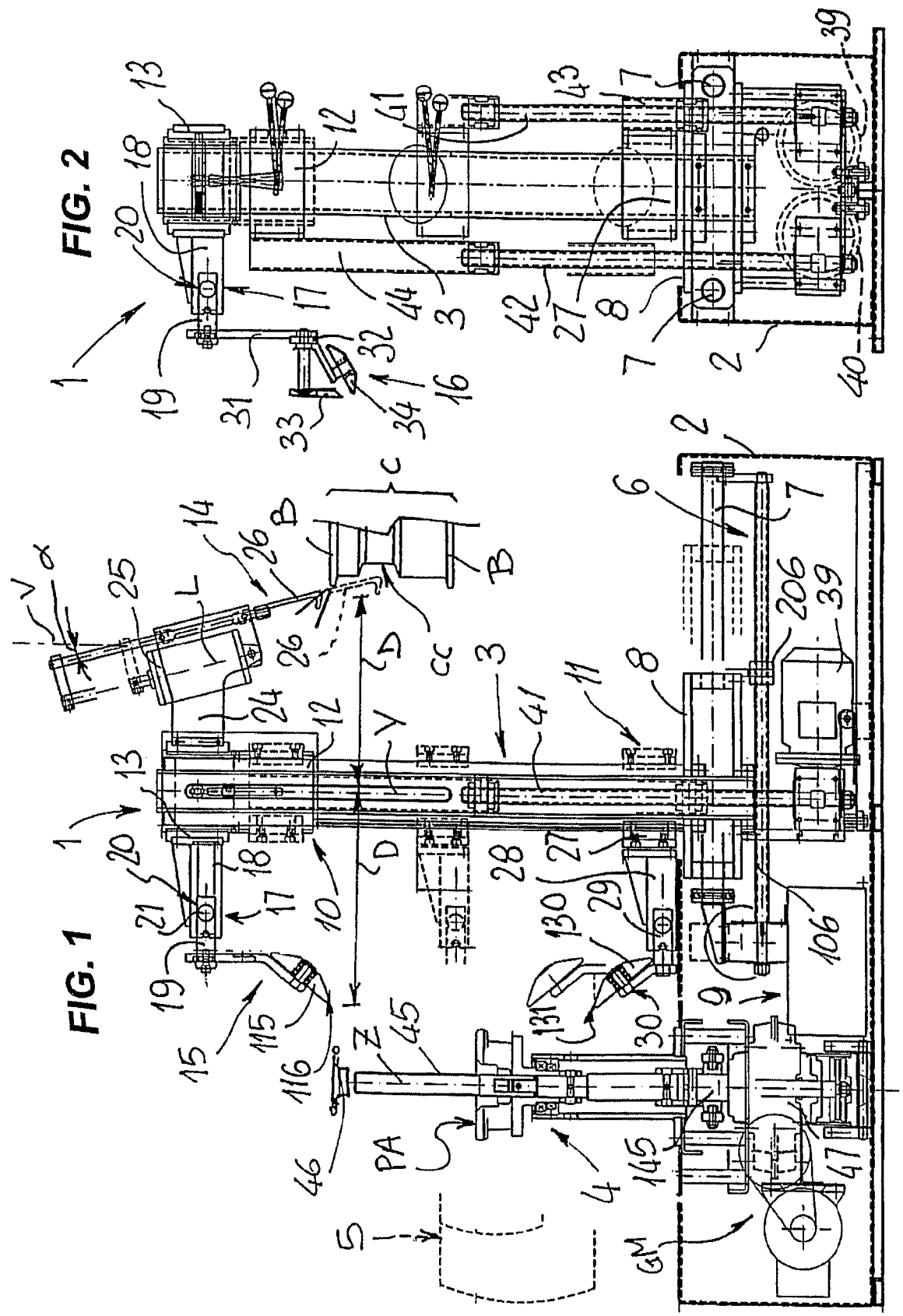

TYRE DEMOUNTING MACHINE

FIELD OF THE INVENTION

The invention relates to a tire demounting machine, particularly a compact and low-cost machine, adapted for installations in small workshops or narrow spaces, that can perform a number of operations without requiring cyclical replacement of the work-tools typically used for mounting or demounting tires to and from their rims.

BACKGROUND ART

Demounting machines have been long known and widely used to demount and mount vehicle wheel tires from and to their rims.

Such prior art demounting machines comprise a base which has a rotating platform arranged thereon for receiving the wheels in a lying position, and is equipped with lock devices, designed to grip and hold the wheel rims during the work operations.

A generally vertical column extends upwards from the base, and supports a substantially horizontal arm at its upper end, which arm is typically mounted to a carriage which slides along the column.

A rod facing towards the platform, i.e. downwards, is mounted to a free end of this horizontal arm, and is in turn able to slide relative to the arm, towards or away from the platform.

This rod has a connector at its bottom end, for mounting work-tools thereto, which tools are interchangeable as needed.

A second column is provided parallel to the column, and is also generally linked to the base, and has a de-beading device supported thereon, i.e. a device designed to press the tire bead either to remove it from the edge of the rim to which it is mounted or to push the bead into the inner channel of the rim.

This de-beading device is composed of two substantially horizontal and parallel arms, which are mounted, overhanging towards the rotating platform, on independently sliding carriages, which slide along guides formed on such second column, and are designed to move towards or away from and parallel to each other, and are driven by specially designed fluid dynamic units.

Each arm of the de-beading device has a bead pressing tool at its free end, which tool is typically a frustoconical element, freely rotating with an appropriately tilted axis of rotation, for its outer edge to act upon the tire bead of a wheel, when the latter is locked on the work platform, and to press it, as mentioned above, into the channel of the rim to which it is mounted, or out of such channel.

A tire mounting/dismounting machine is known from European patent EP 1946946.

According to the above patent, the tire mounting/dismounting machine comprises a base, rotating means for supporting and blocking a wheel and a column associated to the base.

A first arm and a second arm are slidably mounted on the column and an upper first debeader tool and a lower second debeader tool are mounted respectively at the free ends of each arm.

At the free end of the first arm a head is mounted, being rotatable with respect of an axis, and from said head a mounting tool, a dismounting tool and a first debeading tool project.

The tools are mounted in reciprocal positions such that do not interfere with one another and such that by rotating the head with respect to the first arm a same position can be reached for each of the tools.

The head is provided with blocking means for blocking the former in three different positions, a same work position for each of the tools corresponding to each of the three different positions.

A machine for fitting and removing tires and wheel rims for vehicles is known from the European patent EP 1475252.

According to this patent the machine comprises a frame for supporting elements for coupling and turning a rim onto.

A working assembly is supported movably by the frame and comprises a working head for fitting and removing the rim/tire associated with a first translational actuation, and is provided with a tubular pusher transverse to the rotation axis.

The working assembly is associated with an abutment surface associable with a tire side and with at least one tire removal tool associated with a second actuation for alternate movement between an inactive configuration at least partially within the pusher, and at least one active configuration protruding at least partially from the pusher.

A machine for fitting and removing tires and wheel rims for vehicles is known from European patent EP 1897708.

According with said patent, the machine comprises a supporting structure of clamping and rotating means, for clamping and rotating the rim of a vehicle wheel around a rotation axis, at least one operating unit which is associated moving with the supporting structure and which comprises an operating head for fitting and removing a tire onto/from the rim provided with a pushing body for pushing at least one portion of the side surface of the tire and with a grip tool gripping at least one section of the tire bead.

The operating unit further comprises an actuator element for operating the sideways movement of the operating head with respect to the structure and guide means of such sideways movement along a substantially curvilinear direction between a first configuration in which the operating head is substantially close to the clamping and rotation means and a second configuration in which the operating head is substantially moved away from the clamping and rotating means.

While these tire demounting machines have a substantially adequate operation, they still suffer from certain drawbacks.

A first drawback is that they have a very complex and bulky structure, as they have to be equipped with two or even more columns extending from the base, which are required for supporting the various work-tools.

A further drawback is that the distance between the columns in the work position and the rotating platform and hence the overall length of the tire demounting machine is considerable and further increases when of the columns is able to be displaced towards the rear portion of the tire demounting machine, away from the rotating platform, to clear the work space therearound.

An additional drawback is that the distances of the columns from the rotating platform must be adjusted at each processing step, for proper placement of the work-tools relative to the wheels lying on the rotating platform.

Another drawback is that the heights of the work-tool supporting columns should allow the tire repairer to lift the tools from the work space and lie and remove the wheels on and from the rotating platform, without interfering with the tools thereabove.

Also the second column is generally equipped with a joint for articulation relative to the base, which allows it to rotate about a vertical axis, thereby moving the arms of the de-beading device away from the rotating platform.

Nevertheless, such joints add complexity and costs to the tire demounting machines that feature them as compared with the demounting machines with fixed columns, and further require an adequate size increase to prevent the structure from being weakened, to withstand the stresses acting upon the joints during operation.

A further drawback is that these tire demounting machines have very high costs due to their complex construction as described hereinbefore.

A further drawback is that not more than two work-tools at a time can be mounted to the connector of the rod supported to the horizontal arm, both arranged on a common support with a joint that, once it is mounted to the connector of the rod, allows rotation about an axis to orient either tool towards the rotating platform.

Therefore, during the various work steps, tire repairers are required to often replace the tools mounted to the connector of this rod, to complete all the required operations on tires.

These replacements, which occur frequently for each vehicle lead to the buildup of a considerable dead time during each working day.

DISCLOSURE OF THE INVENTION

One object of the present invention is to improve the state of the art.

One object of the invention is to provide a tire demounting machine that has a considerably simplified construction, remarkably lower costs and lower space requirements than prior art tire demounting machines.

Another object of the invention is to provide a tire demounting machine that allows more than two work-tools to be available for immediate use, and avoids a great number of replacements thereof to be required for completing tire mounting and demounting operations, thereby reducing dead times.

A further object of the invention is to provide a tire demounting machine that does not require multiple distance adjustments between the work-tools and the wheels to be processed by these tools to mount and demount tires to and from rims.

In one aspect the present invention relates to a tire demounting machine as described hereinafter.

Therefore, the tire demounting machine of the invention affords simple, quick and inexpensive mounting and demounting of tires from rims.

The tire demounting machine of the invention can be also installed in very narrow operating spaces, because its particular construction allows it to have a very compact overall size, as compared with prior art tire demounting machines.

The tire demounting machine of the invention also allows more than two work-tools at a time to be ready for use, and avoids replacements thereof in the mounting and demounting process, thereby considerably reducing the dead time.

BRIEF DESCRIPTION OF THE DRAWINGS

Further characteristics and advantages of the invention will be more apparent upon reading of the detailed description of one preferred, non-exclusive embodiment of a tire demounting machine of the invention, which is illustrated by way of example and without limitation in the annexed drawings, in which:

FIG. 1 is a lateral schematic transparent view of a first embodiment of a tire demounting machine of the invention;

FIG. 2 is a front view of the tire demounting machine of FIG. 1;

DETAILED DESCRIPTION OF A PREFERRED EMBODIMENT

Figure 3:
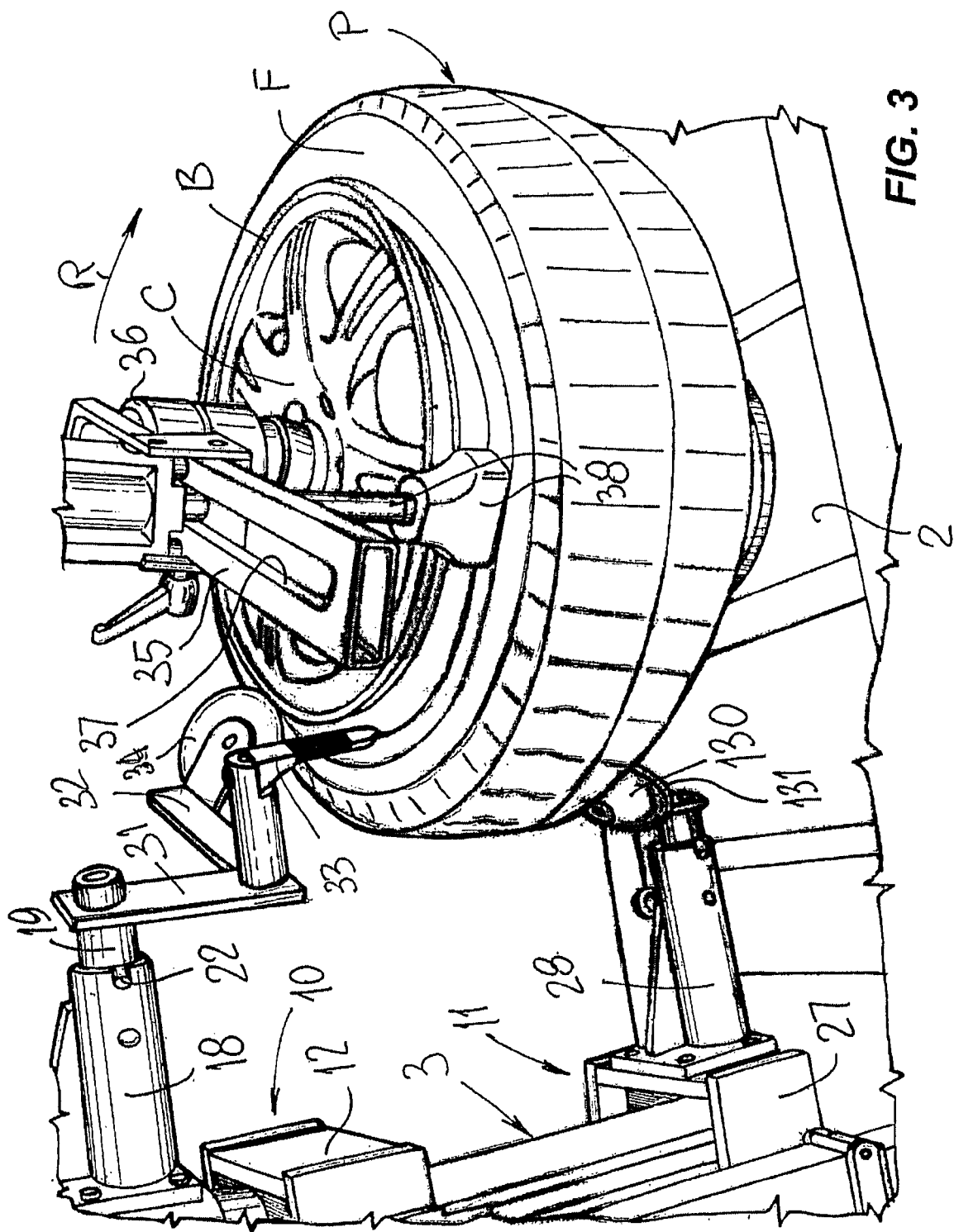
FIG. 3 is an enlarged view of a detail of the tire demounting machine of FIG. 1.

Referring to the figures, numeral 1 designates a tire demounting machine that comprises a base 2 and a tool-supporting column 3 rising from the base 2 in a vertical or substantially vertical direction, and defining a longitudinal axis "Y".

A support unit 4 is also mounted to the base 2, and is designed to support wheels 5 during processing steps on the tires "P" thereof and is generally known as a "self-centering unit".

As shown in FIG. 1, the support unit 4 defines a rest plane "PA" and a first axis of rotation "Z" which is parallel to the longitudinal axis "Y" and about which the support unit 4 may rotate under control of an operator, which is driven by a corresponding motor unit "GM" held within the base 2.

The support unit 4 is also equipped with lock and release members for locking and releasing wheels 5 lying on the rest plane "PA", as described in greater detail below.

In one embodiment of the tire demounting machine 1, the column 3 is mounted to moving means 6 which comprise a pair of parallel horizontal guides 7, for guided sliding motion of a base foot 8 which is integral with a lower end of the column 3.

The base foot 8 is driven by a motor unit 9, which reciprocates it towards and away from the support unit 4.

Figure 7:
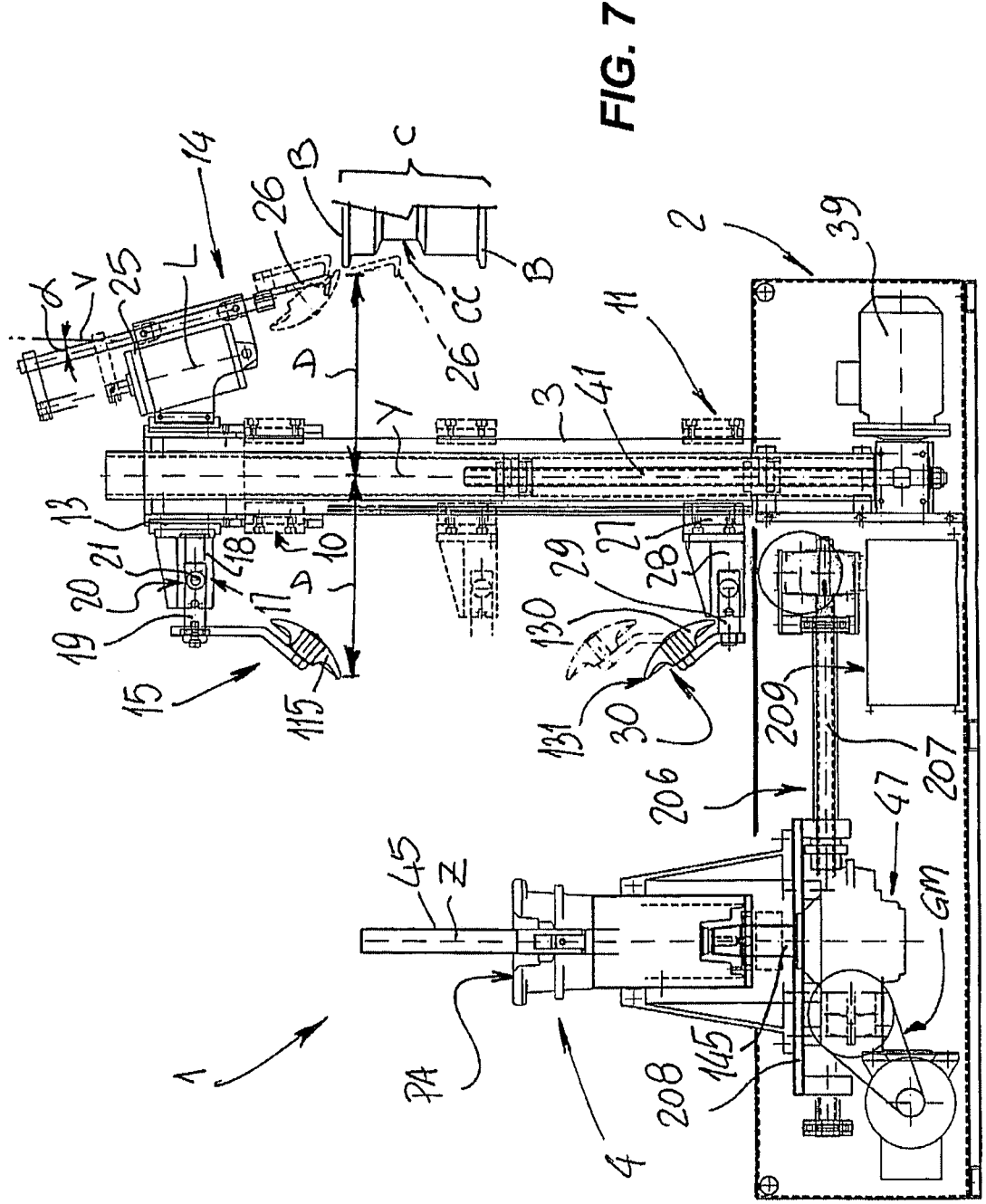
FIG. 7 is a lateral schematic transparent view of a second embodiment of a tire demounting machine of the invention.

In another embodiment of the tire demounting machine 1, as shown in FIG. 7, the column 3 is held stationary on the base 2, with the support unit 4 moving relative thereto, here using its own moving means mounted between the support unit 4 and the base 2, as described in greater detail below.

A first support member 10 and a second support member 11 are mounted to the column 3, and are both slidingly guided along the column 3.

Figure 4:
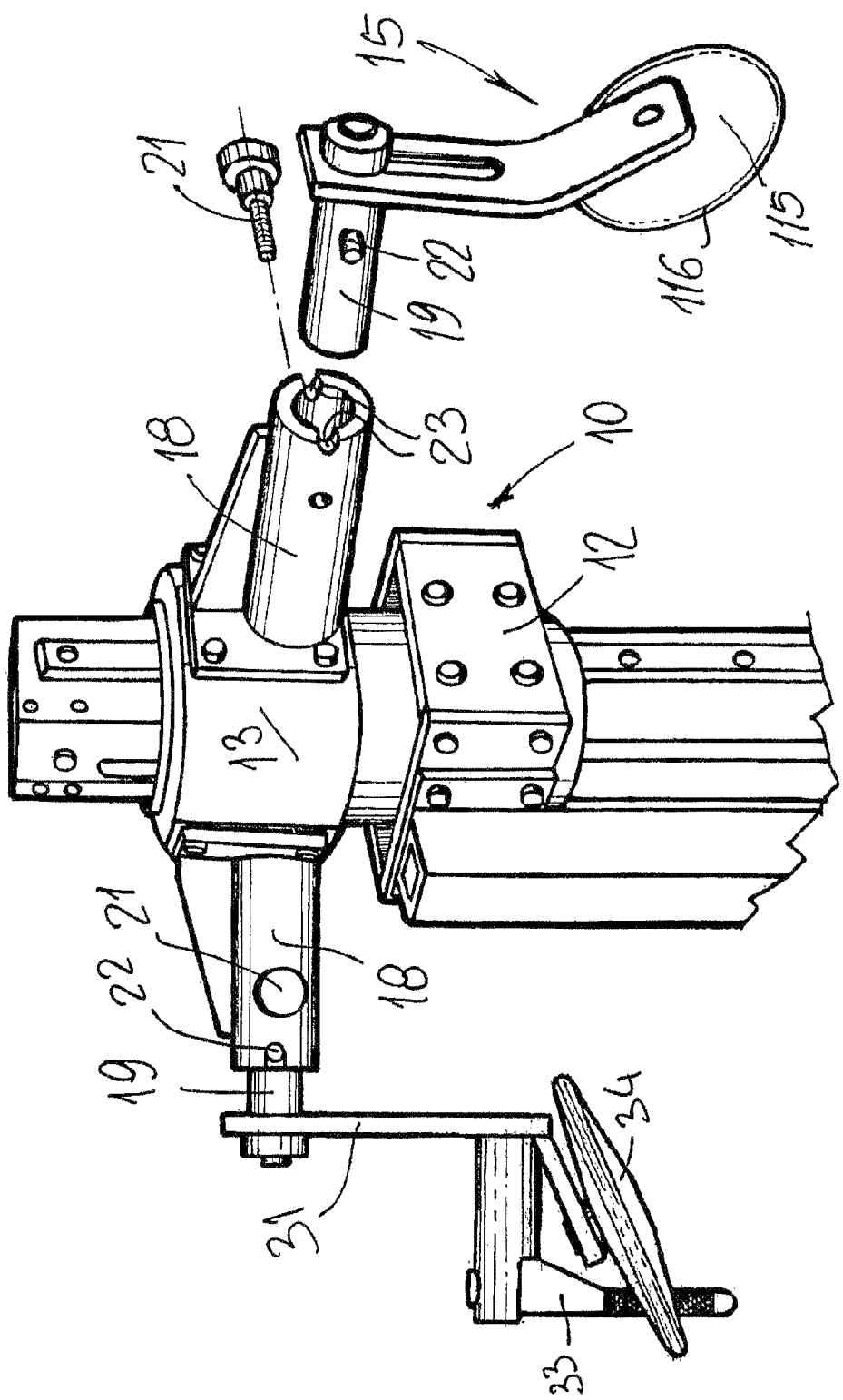
FIG. 4 is a broken, enlarged and partially exploded view of a first support member for a triad of work-tools.
Figure 5:
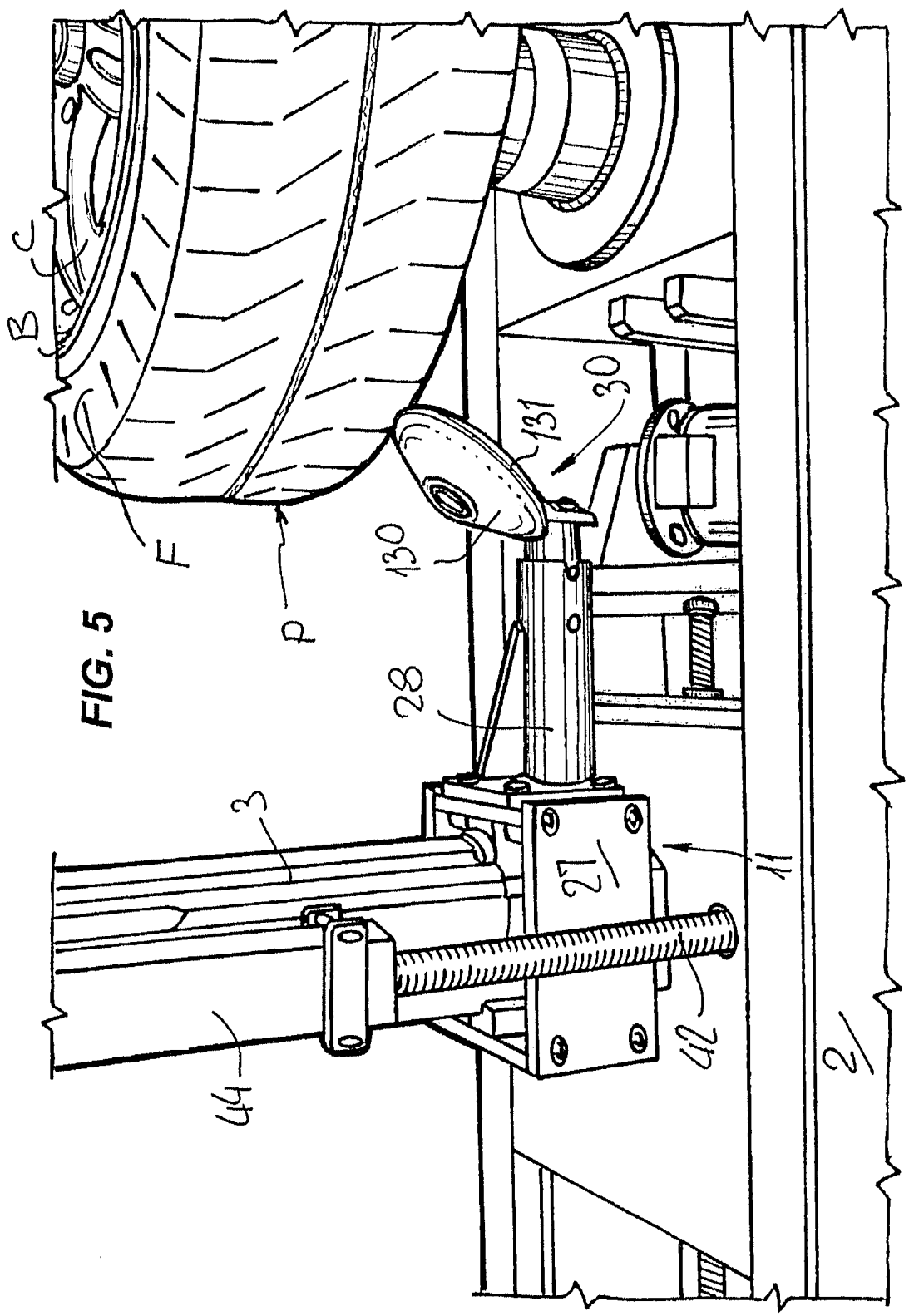
FIG. 5 is an enlarged view of a second support member for a lower de-beading tool.
Figure 6:
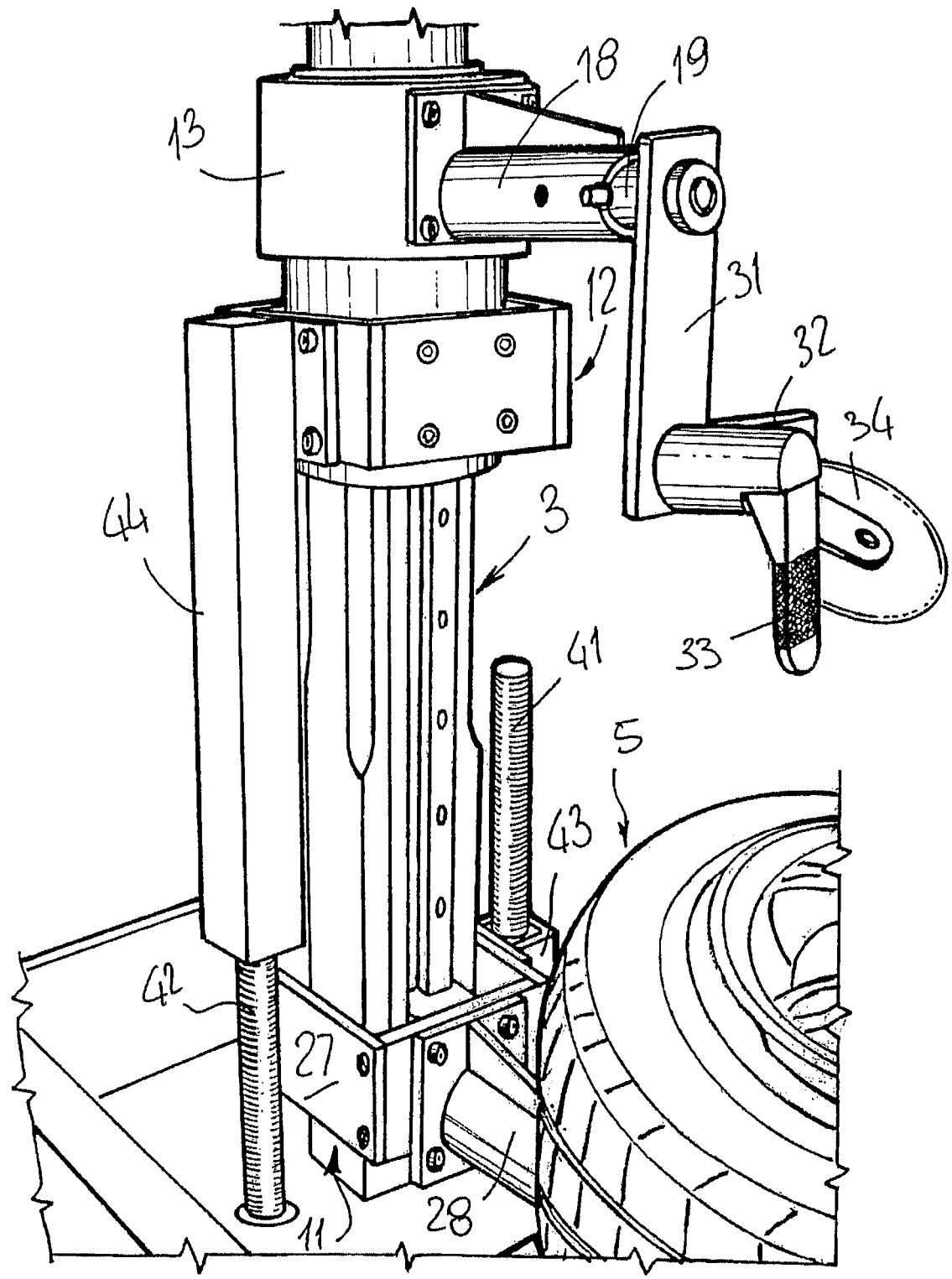
FIG. 6 is a broken enlarged view of tool-supporting column rising from a base, which are both parts of the tire demounting machine of FIG. 1.

As shown in FIGS. 1, 4 and 6, the first support member 10 comprises a first carriage 12 that circumscribes the column 3, and has a collar 13 mounted thereupon.

Such collar 13 is mounted to the first carriage 12 using means that allow to rotate about the axis "Y", to follow arcs of a circle and reach pre-selectable positions.

At least at three pre-selectable positions, the collar 13 has three work-tools mounted thereto, namely an extractor tool 14, adapted to extract the inner edges of the tires "P" from the rims "C" of a wheel 5, a de-beading tool 15, adapted to remove the beads "T" of the tires "P" from the edges "B" of the rims "C" and a pushing tool 16, adapted to push the sides "F" of the tires "P" within the edges "B" of the rims "C" of a wheel 5 while mounting the tires "P".

The term de-beading is intended to designate a step in which the beads "T" of the tires are forced away from the edges "B" of the rims "C" to which they are mounted and against which they adhere during normal operation of the wheels 5, and hence the term de-beading tool is intended to designate a work-tool designed for such step.

The pre-selectable positions of the collar 13 relative to the carriage 12 allow each of the work-tools to be alternately and accurately oriented towards the support unit 4, or define a free workspace above the support unit 4 to allow handling of the wheels 5 as they are laid on the rest plane "PA" or removed therefrom.

Typically, according to the invention, the three work-tools 14, 15, 16 are radially arranged on the collar 13 at 120° from each other, and each of them is supported by removable connector members 17 which, in the case of the tools 15 and 16, comprise a horizontal sleeve 18, radially oriented and integral with the collar 13, for precision slide-fit of the connecting shank 19 extending from the work tools 15 and 16 away from the active operating side thereof.

It shall be further noted that all the points of contact of the tools 14, 15, 16 with the beads "T" are substantially at the same distance from the longitudinal axis "Y" of the column 3, i.e. a distance "D", whereby these points of contact do not change even when the collar 13 is rotated.

The sleeve 18 has lock means 20 mounted thereon for removably locking the shank 19 in an engaged position, which may consist, for instance, of a threaded pin 21, having a control handle, and adapted to be transversely tightened into a through seat formed in the sleeve 18 until it contacts the shank 19 and prevents the latter from sliding, in a locked position.

Means are also provided between each sleeve 18 and the corresponding shank 19, for preventing the latter from rotating about its longitudinal axis when it is engaged in the sleeve 18 and for holding it in a predetermined orientation.

The means for preventing rotation of the shank 19 include at least one transverse pin 22 that projects out of the shank 19 and, when the latter is fitted in the sleeve 18, is received in a recess formed at one outward end of the latter.

On the other hand, the extractor tool 14 is mounted to a support flange 24 which extends from the collar 13, and defines a seat for a fluid-dynamic cylinder 25 whose shaft projects out of the cylinder 25 and moves a hook 26 connected thereto towards the tire "P" of a wheel 5 fixed to the support unit 4, so that such hook 26 fits between the bead "T" of the previously deflated and de-beaded tire "P" and the corresponding edge "B" of the rim "C".

Particularly, to allow proper insertion and extraction of the hook 26 by a single rectilinear motion between the bead "T" and the edge "B" of a rim, the fluid-dynamic cylinder 25 is supported to the support flange 24 with its longitudinal axis "L" inclined at a predetermined angle "a" relative to a vertical plane "V", typically about 15 degrees.

In practice, the inclination of the axis "L" to the vertical plane "V" is determined by the requirement that, as shown in FIG. 1, the hook 26 should slide tangent to the edge "B" and, once it reaches past the bead "T", it should be able to fit into the central channel of the rim "C", referenced "CC" in the figures, before being withdrawn to engage the bead "T" and remove it from the edge "B" of the rim "C".

Once the hook 26 is inserted, as mentioned above, the fluid-dynamic cylinder 25 retracts its shaft in a direction opposite to the previous one, and the hook 26 engages the inner edge of the bead "T" of the tire "P" and lifts it past the edge "B" of the rim "C" at the insertion point.

The second support member 11 comprises, like the first member 10, a carriage 27 sliding along the axis "Y" of the column 3 from the base 2 upwards and vice versa.

The carriage 27 comprises a further sleeve 28, which is very similar to the sleeve 18 and, as described above concerning the work-tools 15 and 16, is designed to receive a shank 29 extending from the rear portion of a further work-tool 30.

The sleeve 28 is also held in a fixed orientation towards the support unit 4 and is designed to cooperate with the de-beading tool 15 either for removing the beads "T" of a tire "P" at the same time as the latter, or for lifting a de-beaded tire "P" upwards, thereby helping the operators to completely remove it from the rim "C".

As shown in FIGS. 1, 3, 4, 5, these de-beading tools 15 and 30 can have a disk shape and are referenced 115 and 130 respectively.

Both disks 115 and 130 have a frustoconical shape and define respective outer peripheral edges, referenced 116 and 131, which are designed to act upon the beads "T" of a tire "P" to be de-beaded.

The shaft 29 is also able to be locked in the sleeve 28, substantially as described above concerning the sleeve 18.

Referring to FIGS. 2, 3, 4, the pushing tool 16 is shown to comprise a support bracket 31 which is mounted to one end of its shaft 19 and is vertically oriented towards the support unit 4.

This bracket 31 has a second transverse, substantially horizontal bracket 32, at its lower end; the bracket 31 is shown to support a claw 33 facing towards the base 2, which is designed to fit between the bead of the tire "P" and the edge "B" of the rim "C" during mounting of the former to the latter.

The second transverse bracket 32 supports in turn a pressure disk 34 which, in the direction of rotation "R" of the support unit 4, is located downstream from the claw 33 and is designed to press the upper side "F" of the tire "P" as the latter is being mounted.

In order to facilitate full insertion of the side "F" into the channel of the rim "C" and, with thrust applied at one point of the side "F" by the pressure disk 34 which is located substantially close to the column 3 relative to the support unit 4, in order to prevent such side "F" from moving away of the thrust point due to the rotation of the support unit 4 and come out of the channel of the rim "C" again, a removable arm 35 is temporarily mounted to the support unit 4, and has one end equipped with a connector 36 for connection to the first axis of rotation "Z", to allow rotation thereof with the support unit 4, and also has a longitudinal slot 37 along which a pressure pad 38 can slide to be positioned in a radial direction and be temporarily fixed in a selected position, to fit any diameter of a tire "P" and apply a thrust to a fixed point of the side "F" thereof, possibly away from the pressure disk 34 as the support unit 4 rotates during mounting of the tire "P".

The two carriages 12 and 27 are slidingly driven along the column 3 by corresponding independent drive means, each comprising a motor 39 and a motor 40, each of which rotates a respective worm 41 and 42.

Each of the worms 41 and 42 is engaged in a corresponding threaded body 43 and 44.

The threaded body 43 is integral with the carriage 12, whereas the threaded body 44 is integral with the carriage 27.

Typically, as a worm rotates, it causes the corresponding carriage to slide along the column 3 upward or downward, depending on its direction of rotation.

The wheels 5 are locked on the support unit 4 by means of a shaft 45 which rises coaxial with the axis "Z" and extends perpendicularly through the rest plane "PA", and which is designed to be introduced into the central hole of a rim "C" of a wheel 5.

The shaft 45 has external threads on its upper portion for threadingly receiving a nut 46 substantially known to the skilled person, which has a conical surface, adapted to be engaged in a self-centering fashion in the central hole of the rim "C".

The shaft 45 has a lower end 145 articulated to a push/pull unit 47 held within the basement 2, which is designed to axially reciprocate the shaft 45 downward or upward.

Referring to FIG. 7, in the second embodiment of the tire demounting machine 1, the support unit 4 is slidingly mounted to the base 2, whereas the column 3 is stationary.

The support unit 4 is displaced, like in the column 3 of the previous embodiment, on moving means 206 which comprise a pair of parallel horizontal guides 207, for guided sliding motion of a base foot 208 which is integrated with the base foot of the support unit 4.

Once again, a motor unit 209 is provided to move the support unit 4 towards or away from the column 3.

The operation of the first embodiment of the tire demounting machine 1 of the invention is as follows: when an operator is required to demount a tire "P" from a wheel 5, he/she lays the latter on the rest plane "PA" of the support unit 4, after removing the nut 46 and introducing the shaft 45 into the central hole that is usually found in a rim "C".

Here, the push/pull unit 47 holds the shaft 45 lifted in its highest position, and the operator can thus tighten the nut 46 to the threaded end of the shaft 45 to engagement of its conical portion with the central hole of the rim "C".

As soon as the nut 46 and the rim "C" have come to full engagement, the operator actuates the push/pull unit 47, which applies a downward pull force, i.e. directed towards the base 2, to the shaft 45 and the nut 46, thereby locking the wheel 5 on the rest plane "PA".

As the wheel 5 is installed on the rest plane "PA", the column 3 is held away from the support unit 4, i.e. with the base 2 displaced to the right, as viewed when watching FIG. 1.

With wheel 5 fixed to the support unit 4, the operator can demount the previously deflated tire "P".

To do this, the column 3 is displaced along the guides 7 by the moving means 6 which consist, for instance, of a worm 106 rotated by the motor unit 9 and engaged with a threaded sleeve 206 integral with the sliding base foot 8.

The column 3 is thus placed next to the support unit 4, at such a distance therefrom as to allow the disks 115 and 130 to act upon both beads (T) of the tire "P".

For this purpose, the carriage 12 is first displaced towards the upper end of the column 3 and the collar 13 is rotated to a predetermined angle to hold the sleeve 18 that supports the disk 115 towards the support unit 4, aligned parallel to the sleeve 28 that supports the lower disk 130 and is then fixed in this position.

Next, the motor 40 is actuated to rotate the worm 42, which draws the carriage 12 towards the base 2, thereby progressively lowering the disk 115 onto the bead "T" of the tire "P", namely by fitting the peripheral edge 116 thereof between the edge "B" of the rim "C" and the bead "T" of the tire "P" and firmly pressing the latter.

Then, the support unit 4 is rotated to make a complete turn of the tire "P" and, during rotation, the disk 115 presses upon the entire circumference of the bead "T" here the upwardly facing bead, or upper bead, thereby pushing it into the channel of the rim "C".

This step is repeated with the disk 130 on the bead "T" of the tire "P" that faces towards the base 2, or lower bead, with the carriage 27 being lifted by actuating the motor 39, which rotates the worm 41, the latter pushing the carriage upwards to pressing contact with the lower bead "T" of the tire "P", until the bead "T" also fits into the channel of the rim "C".

As the support unit 4 is rotated in the direction of rotation "R", the whole lower bead "T" is fully pushed into the channel "CC" of the rim "C", whereby the tire "P" becomes loose with respect to the rim.

The skilled person will understand that the terms "upper" and "lower" as used hereinbefore, and later on, are related to the lying position of the wheel 5 on the plane "PA" of the support unit 4, in the exemplary embodiment of the tire demounting machine 1 as shown in the figures.

As the de-beading step is completed, the operator can demount the tire "P" from its rim "C".

To do so, he/she will first move the carriages 12 and 27 away from the rest plane "PA" of the support unit 4, by actuating the motors 39 and 40 and hence of the worms 41 and 42 in the reverse direction.

Then, he/she will rotate the collar 13 until the extractor tool 14 is aligned with the support unit 4 and will fix the collar 13 in this position.

Next, the operator will start the motor 40 again to move the carriage 12 downward toward the base 2, until the hook 26 comes close to the edge "B" of the rim "C" and the inner edge of the upper bead "T".

It shall be noted that the hook 26 will be at the same distance from the longitudinal axis "Y" as the other worktools 15 and 16: This will allow the three tools to be constantly at the proper distance from the beads "T" of the tires "P" after each rotation for selection and radial positioning of the collar 13, and avoids the need to correct the positions of the worktools by further adjustments of the column 3 relative to the support unit 4.

If the position is not correctly reached, the operator will move the base mount 8 of the column 3 along the horizontal guides 7 to reach the desired position.

Then, the operator will actuate the fluid dynamic (typically pneumatic) cylinder 25 and slide the hook 26 towards the base 2 until it fits between the bead "T" and the edge "B", as schematically shown in FIG. 1 by broken lines and on the side opposite to the one in which the operation is actually carried out.

This will move the hook 26 in a reverse direction, and will cause it to slide upward, to engage the edge of the bead "T" and lift it past the edge "B" of the rim "C".

Now, the operator will stop the action of the fluid dynamic cylinder 25 and rotatably actuate the support unit 4 to make a complete turn of the wheel 5, whereby the hook 26 will lift the whole edge of the bead "T" past the edge "B" of the rim "C".

Once this step has been completed, the operator will move the hook 26 away from the tire, by lifting the carriage 13 towards the upper end of the column 3 and also retracting the shaft of the fluid dynamic cylinder 25.

Then, the operator will rotate the collar 13 again to a position in which two sleeves 18 are oriented outward, in other words so that the bisector of the 120° angle between two contiguous sleeves 18 is aligned with the axis of rotation "Z" of the support unit 4.

This will create some free space above the latter to allow the operator to carry out the final steps of removing the tire "P" from the rim "C".

These final steps still involve the use of the lower disk 130 which is lifted upward to push the tire "P" in the same direction.

At the same time, the operator will hold the tire by both hands and move it relative to the rim "C", possibly using a known lever, to allow the lower bead "T" to also pass over the upper edge "B" of the rim "C", thereby completing the removal of the tire "P".

The steps for mounting a new tire to the rim "C" are as follows: the carriage 27 is lowered to the lowermost position towards the base 2 to avoid any interference.

The collar 13 is held in the position in which none of the sleeves 18 will interfere with the space above the support unit 4 and the operator lies a new tire "P" on the upper edge "B" of the rim "C" while holding the support unit 4 against rotation.

Then, he/she will cause the lower bead "T" of the new tire "P" to pass over the upper edge "B", by slightly moving it relative to the rim and also pushing it towards the base, and fits it loosely in the central channel "CC" of the rim "C".

In order to cause also the upper bead "T" to pass over the upper edge "B", the operator will rotate the collar 13, to move the claw 33 and the pressure disk 34 to their work position, i.e. oriented towards the support unit 4, and fixes this position of the collar 13.

Then, he will actuate the motor 40 that will move the carriage 12 downward, to fit the claw 33 between the side "F" and the edge "B" and cause the pressure disk 34 to contact the upper side "F" of the tire "P", as shown in FIG. 3.

Next, he/she will further lower the carriage 12 so that this thrust will cause the upper bead "T" to pass over the edge "B" at the thrust point.

Now, the operator will rotate the support unit 4 to a short length in the direction of rotation "R", so that a corresponding portion of the circumference of the upper bead "T" will pass over the edge "B".

When the support unit 4 is still again, he/she will fit the arm 35 on the upper end of the shaft 45 and place the pressure pad 38 on the portion of the side "F" that has passed over the edge "B", directly downstream from the claw 33 and the pressure disk 34.

Then, the operator can rotatably actuate the support unit 4 again, to make a complete turn of the wheel 5.

The combined action of the claw 33 and the pressure exerted by the pressure disk 34 and the pad 38, which rotates with the arm 35 and remains in the predetermined application point on the upper side "F" of the tire "P" and the rotation of the support unit 4, cause the entire upper bead "T" to progressively pass over the upper edge "B", towards the channel "CC" thereby allowing the new tire "P" to be completely mounted to the rim "C".

The operation of the second embodiment of the tire demounting machine 1 is substantially as described above concerning the first embodiment, except that the column 3 is fixed to the base 2, whereas the support unit 4 moves towards or away from the column 3, to move the wheels 5 to the work positions of the work-tools 14, 15 and 16.

The invention was found to fulfill the intended objects.

The invention so conceived is susceptible to a number of changes and variants within the inventive concept.

Furthermore, all the details may be replaced by other technically equivalent parts.

In practice, any materials, shapes and sizes may be used as needed, without departure from the scope of the following claims.

The invention claimed is:

1. A tire demounting machine comprising:
a base;
a supporting unit for supporting wheels on a rest plane, said supporting unit turning around a first longitudinal axis, said supporting unit being supported on said base and equipped with blocking and releasing elements of supported wheels;
a work-tools supporting column which rises from said base and has a second longitudinal axis substantially parallel to said first longitudinal axis (Z); and
a first support element for supporting at least three work-tools over said rest plane (PA), said first support element being slidingly mounted along said second longitudinal axis on said work-tools supporting column,
wherein said first support element is orientable by means for orienting around said second longitudinal axis, such to orient each work-tool toward said supporting unit alternatively,
wherein each of said at least three work-tools is coupled to said first support element by respective removable fastening arrangements which are peripherally placed on said first support element and radially oriented in relation to said second longitudinal axis, and
wherein said fastening arrangements comprise, for each work-tool:
a radial and projecting sleeve associated with said first support element and facing outwardly in relation to said second longitudinal axis;
a coupling stem which protrudes from said work-tool opposite of a working portion of said working tool; and
a removable blocking member of said stem inside said sleeve.

2. The tire demounting machine according to claim 1, wherein said fastening arrangements of said at least three work-tools are angularly spaced from one another according to selected angles.

3. The tire demounting machine according to claim 2, wherein said selected angles comprise angles of 120°.

4. The tire demounting machine according to claim 1, wherein said work-tools supporting column and said supporting unit are configured to be reciprocally drawn up or moved away according to a moving direction which is perpendicular to said second longitudinal axis and said first longitudinal axis of said supporting unit.

5. The tire demounting machine according to claim 4, wherein at least said work-tools supporting column is mounted on a moving system which is movable along said base according to said moving direction.

6. The tire demounting machine according to claim 4, wherein at least said supporting unit is mounted on a moving system which is movable along said base according to said moving direction.

7. The tire demounting machine according to claim 1, wherein at least a further second support element for supporting a further work-tool oriented toward said supporting unit for supporting wheels is slidingly mounted on said work-tools supporting column along said second longitudinal axis between said base and said first support element, such to work on supported wheels from a lower part by cooperating with at least a selected symmetrical work-tool selected among said at least three work-tools of said first support element.

8. The tire demounting machine according to claim 7, wherein said first and second support elements are independently movable on said work-tools supporting column, driven by a respective driving system.

9. The tire demounting machine according to claim 7, wherein said further work-tool comprises an additional de-beading unit.

10. The tire demounting machine according to claim 1, wherein said at least three work-tools comprise:
one tire extraction unit from respective rims;
one tire bead de-beading unit from edges of said respective rims; and
one tire side pushing unit toward an inside of said respective rims.

11. The tire demounting machine according to claim 10, wherein an additional removable pressing arrangement is associated with said supporting unit and so configured to cooperate with said tire side pushing unit when said supporting unit rotates.

12. The tire demounting machine according to claim 11, wherein said pressing arrangement comprises an adjusting system configured to adjust a pressure point on a side of a tire according with a diameter of said tire.

13. The tire demounting machine according to claim 11, wherein said pressing arrangement comprises:
- one arm having one end structured to be coupled to said supporting unit according to said first longitudinal axis and further having an opposite end facing radially; and
- one pressing bumper slidingly mounted on said arm, guided by a guiding element, and configured to be blocked in a pressing position by a blocking element.

14. The tire demounting machine according to claim 1, wherein said at least three work-tools define a respective contact point with said wheels which is substantially equidistant from said second longitudinal axis.

* * * * *